Figures 10, 11:
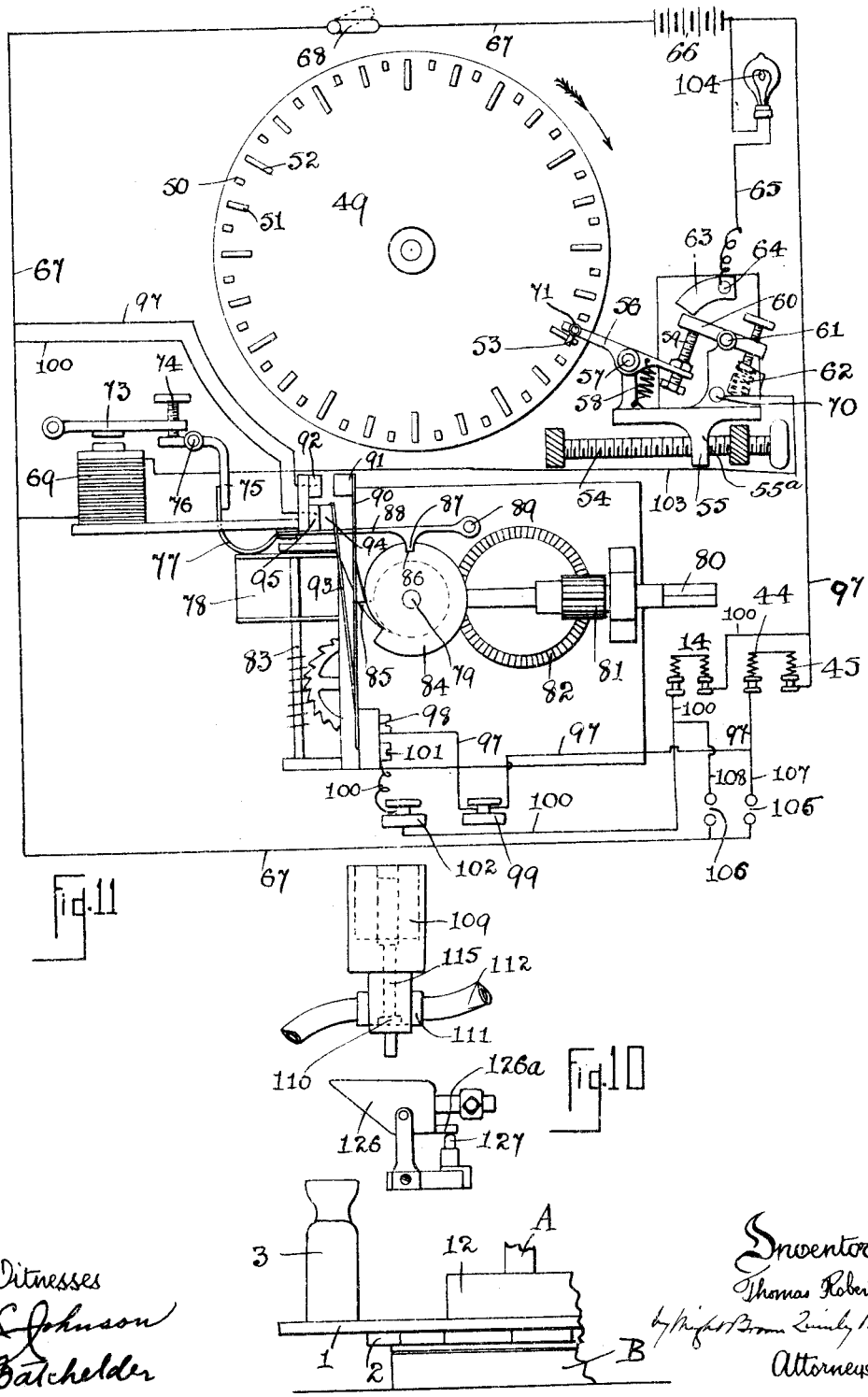

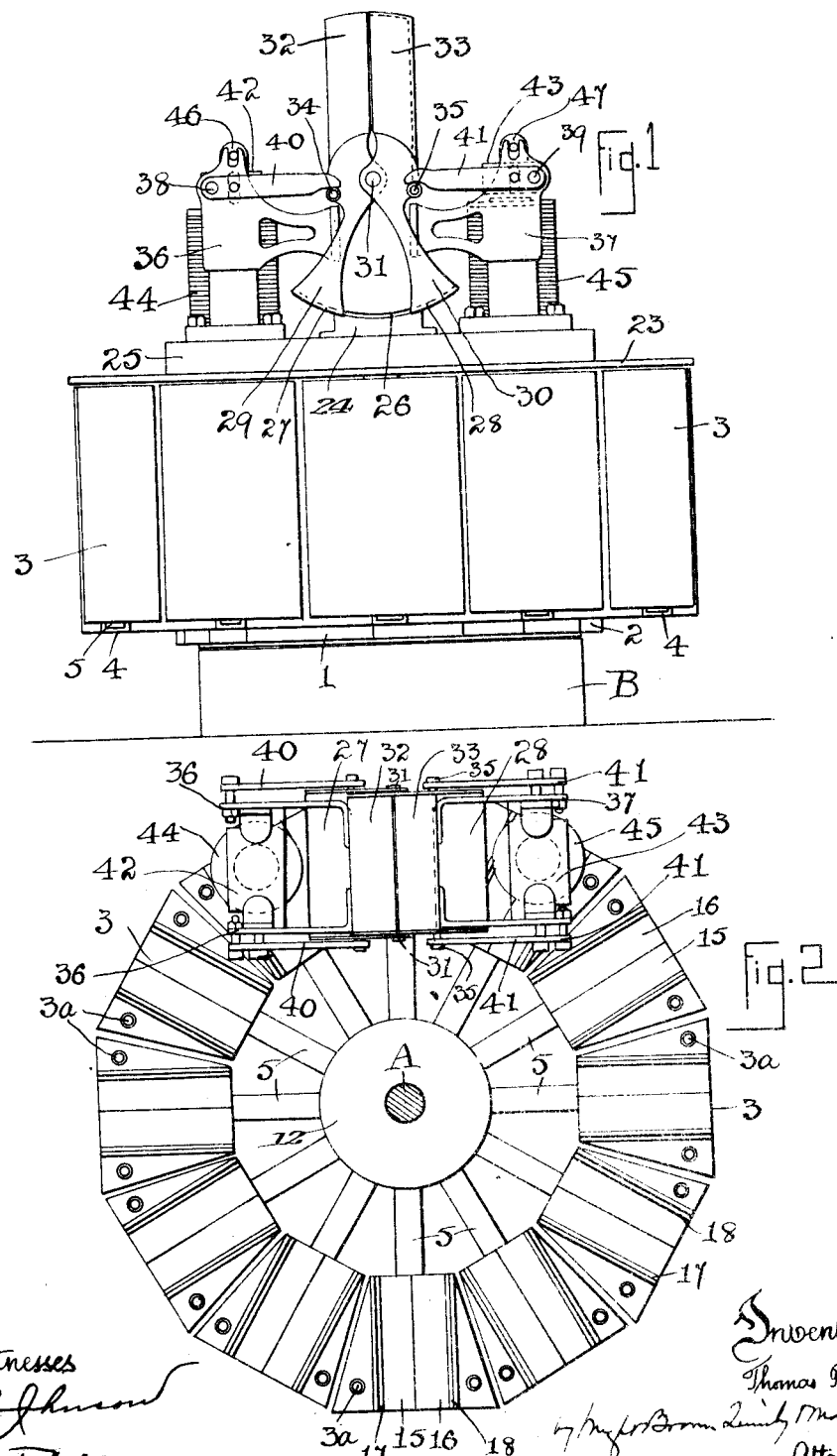
T. ROBERTS.
MEANS FOR TAKING SAMPLES OF POWDERED SUBSTANCES OR LIQUIDS.
APPLICATION FILED OCT. 19, 1912.
1,101,568.
Patented June 30, 1914.

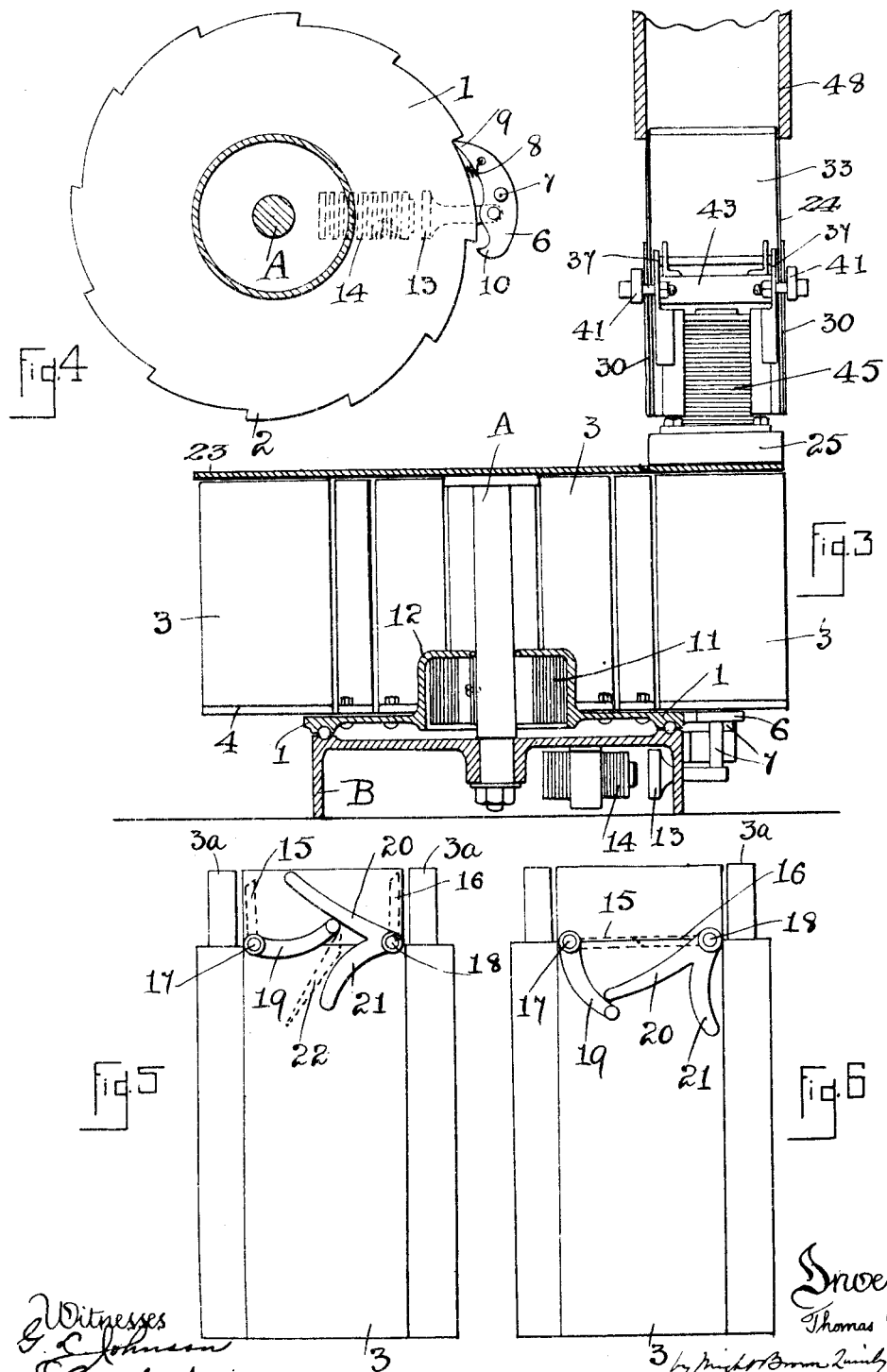

T. ROBERTS.
MEANS FOR TAKING SAMPLES OF POWDERED SUBSTANCES OR LIQUIDS.
APPLICATION FILED OCT. 19, 1912.
1,101,568.
Patented June 30, 1914.
5 SHEETS—SHEET 3.
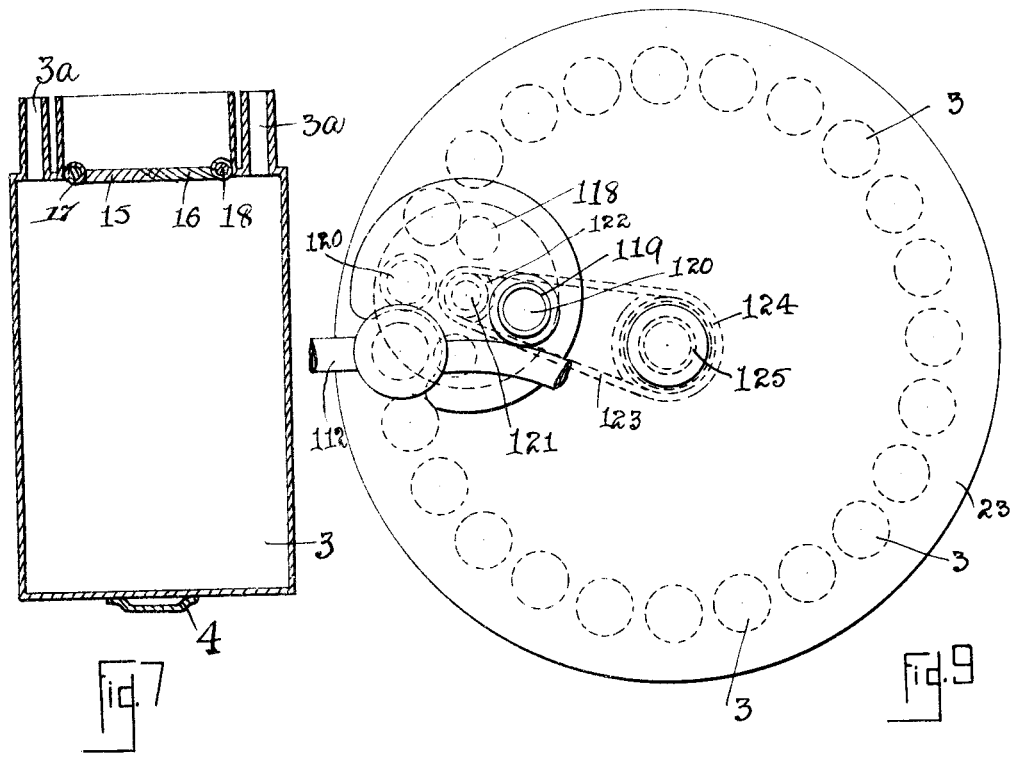
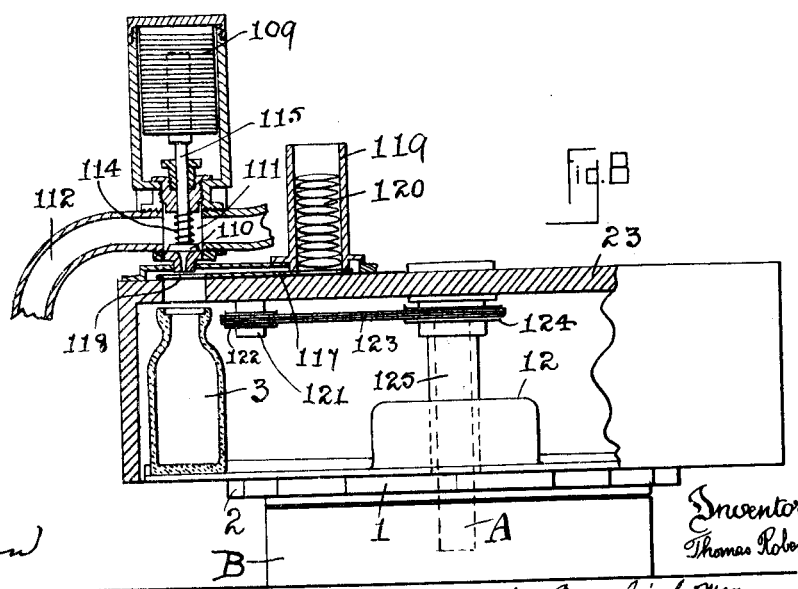

T. ROBERTS.
MEANS FOR TAKING SAMPLES OF POWDERED SUBSTANCES OR LIQUIDS.
APPLICATION FILED OCT. 19, 1912.

1,101,568.

Patented June 30, 1914.
5 SHEETS—SHEET 4.

Witnesses
G. L. Johnson
E. Batchelder

Inventor
Thomas Roberts
by Wright Brown Quinby May
Attorneys

T. ROBERTS.
MEANS FOR TAKING SAMPLES OF POWDERED SUBSTANCES OR LIQUIDS.
APPLICATION FILED OCT. 19, 1912.
1,101,568.
Patented June 30, 1914.
5 SHEETS—SHEET 5.
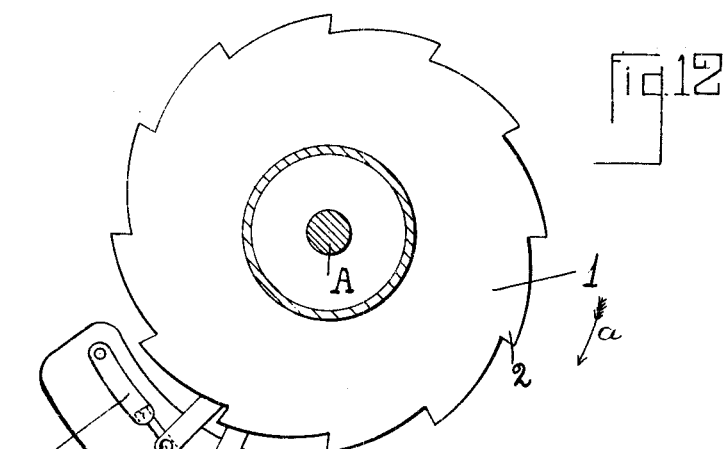
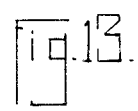
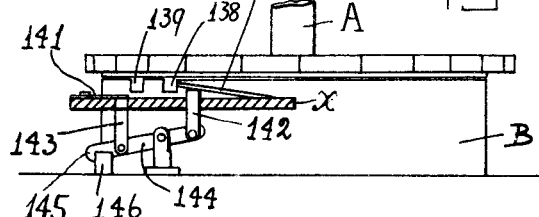
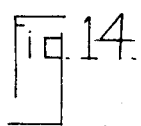
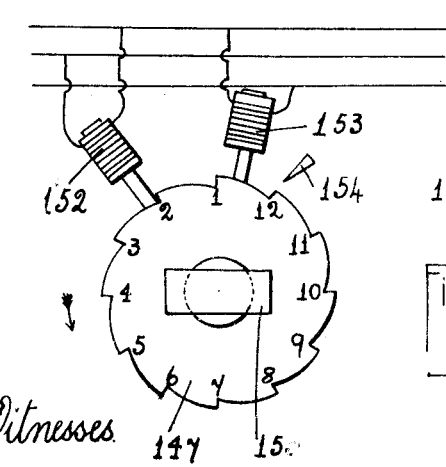

UNITED STATES PATENT OFFICE.

THOMAS ROBERTS, OF BOLTON, ENGLAND.

MEANS FOR TAKING SAMPLES OF POWDERED SUBSTANCES OR LIQUIDS.

1,101,568.  Specification of Letters Patent.  Patented June 30, 1914.

Application filed October 19, 1912. Serial No. 726,590.

*To all whom it may concern:*

Be it known that I, THOMAS ROBERTS, a subject of the King of Great Britain, and resident of 33 Deane road, Bolton, in the county of Lancaster, England, have invented a certain new and useful Improvement in Means for Taking Samples of Powdered Substances or Liquids, of which the following description, together with the accompanying sheets of drawings, is a specification.

This invention relates to apparatus or devices for taking samples of material such as powdered substances or liquids, and refers particularly to apparatus in which the devices are operated by clockwork.

In carrying out my present invention I provide apparatus whereby the devices which actually take the samples are not operated directly by a clock as usually heretofore done, but are merely controlled by clockwork and are operated electrically, by which means I may employ one clock or clockwork device to control any suitable number of sampling machines or apparatus, while said clock or clockwork need not be mounted in proximity to the sampling machines as is the case with those of ordinary construction, wherein the clock or clockwork is exposed to the dust, dirt or fumes of or in the room wherein it is fixed, but may be fixed at a distance therefrom and out of reach of the operative who attends to the machine. The samples may be taken periodically at predetermined times arranged by the clock, or separate or additional samples may be obtained by operating a switch or switches located say in the office of the works or other central place.

In order that my said invention may be readily understood, I have hereunto appended sheets of drawings in which:—

Figure 1 is a side elevation of apparatus for taking samples of powdered substances, constructed in accordance with my invention; Fig. 2 is a plan of said apparatus with the cover thereof, as hereinafter described, removed; Fig. 3 is a sectional side elevation of said apparatus; Fig. 4 is a sectional plan of certain parts hereinafter referred to; Figs. 5 and 6 are end elevations of a tin or receptacle for receiving samples of powdered substances; Fig. 7 is a sectional elevation thereof; Fig. 8 is a sectional side elevation of a machine for taking samples of liquids; Fig. 9 is a plan thereof; Fig. 10 is an elevation of a modified form of apparatus for taking samples of liquid; Fig. 11 is a diagram showing the clockwork and its connections to the sample taking apparatus; Figs. 12, 13, 14 and 15 are detail views illustrating means for automatically arresting the operation of the machine when the receptacles have all received their samples.

Similar letters and figures of reference indicate like parts throughout the several views.

B is a base plate having a rod or upright A on which is rotatably mounted a disk or plate 1 provided with teeth 2 (Fig. 4). Upon the plate 1 are mounted receptacles 3, these being held in position, if desired, by socket members 4 at the bottom of the receptacles which fit over extensions or radial arms 5 of the disk 1. The disk 1 is free to rotate and is held under control by the escapement 6 pivoted on a fixed pin 7 and acted upon by a spring 8. The escapement 6 has its ends 9, 10, shaped as shown so that when the part 9 is withdrawn from contact with one of the teeth 2 of the disk 1 the end 10 will be caused to engage with another tooth to hold said disk against rotation until released, when the end 9 will engage with the next or succeeding tooth.

The coiled spring 11 is mounted within the box 12 forming part of the ratchet disk 1 and causes the rotation of said disk when liberated by the escapement 6. Connected to the escapement is the armature 13 of an electro-magnet 14 which is arranged to have a circuit completed through it in the manner hereinafter described, to control the movements of the escapement. The receptacles 3 are provided with covers 15, 16, carried by hinge pins 17, 18, respectively. The pin 17 has mounted upon it the arm 19, while the pin 18 has fixed upon it the two armed levers 20, 21. The arm 19 is arranged to come into contact with a suitably supported cam rib 22 indicated by dotted lines in Fig. 5. Normally the hinged covers are closed, as indicated in Fig. 6, the arms 19, 20, 21, being lowered. The cam rib 22 is suitably mounted in fixed position so that as each receptacle 3 approaches position to receive material, the end of arm 19 engages the cam rib and is swung upwardly to the position shown in Fig. 5, said arm engaging arm 20 and swinging that one upwardly also, so that the covers 15, 16, are opened. After passing the cam rib 22, the weight of the arms 19, 20, 21, acting first, and then the weight of the covers also acting, causes the covers to close automatically. The receptacles 3 are also provided with openings 3ª through which air may escape at the time the samples are being fed to said receptacles.

The plate 23 which is mounted on a rod A extends over all the receptacles 3 with the exception of an opening which is below a chute or channel 24, the base of which is indicated at 25 in Fig. 3, as mounted on the plate or cover 23. The chute has openings 26 for the passage of valve plates 27, 28, the arms 29, 30 carrying said plates being hinged at 31 and extending upwardly at 32, 33, to form a chamber or box the upper end of which is closed when in the position incated by Fig. 1, but which is open when the plates 27, 28 are caused to approach each other. The plates 27, 28, a portion of the chute 24, and the box members 32, 33, form a measuring chamber for the powdered substance as hereinafter described. The arms 29, 30, are provided with projecting pins or pins having rolls 34, 35, mounted upon them. Brackets 36, 37, are supported by the base piece 25. Fulcrumed at 38, 39 on the brackets 36, 37, are levers 40, 41, the ends of which act on the rolls 34, 35. Said levers carry armatures 42, 43, of electro-magnets 44, 45, an electrical circuit being formed through these latter at the times and in the manner hereinafter described. On the completion of said electrical circuit the armatures 42, 43, are drawn downwardly, thus causing the levers 40, 41, to operate the arms 29, 30, so as to cause the members 32, 33 of the chamber for the reception of the powdered substances to be separated and the valve plates 27, 28 to approach each other, so as to retain the powdered substances in said chamber, which thus forms a measuring device. The armatures 42, 43, are guided in slots 46, 47, formed in the brackets 36, 37. The measuring chamber above described is so mounted relatively to the main chute 48 of a flour milling or other apparatus, that the material descending through said chute can pass said measuring chamber when closed, and at such times when it is desired to take a sample and the measuring chamber is opened, then some of the material will enter said chamber.

In order to cause samples to be periodically taken, the electrical circuits which are completed through the elctro-magnets 14, 44, 45, are controlled by clockwork mechanism, and this clockwork mechanism may be mounted at any desired distance from the sample taking device. The first circuit to be completed is that through the electro-magnets 44, 45, by means of which a sample is permitted to enter the measuring chamber, such circuit remaining closed for a sufficient length of time for said measuring chamber to receive its full quantity, after which the circuit is broken. Immediately afterward a circuit is completed through the electro-magnet 14 by means of which the escapement 6 is moved so that its end 9 releases the disk 1, its other end 10 coming into contact with one of the teeth 2 in said disk 1. This electrical circuit is only necessary to be of momentary duration, as immediately it is broken the spring 8 releases the end 10 from the tooth in the plate 1 and causes the end 10 to engage with the next or succeeding tooth 2, thus the next or succeeding receptacle will be in position to receive its sample of powdered substance.

49 (Fig. 11) is a disk mounted in any convenient position, and is rotated by any appropriate and well known clockwork mechanism so as to rotate say once in every twenty-four hours, such ordinary clockwork train not being necessary to illustrate in the drawings. Arranged upon the surface of this disk 49 are projecting parts 50, 51, 52, of any appropriate number and of varying lengths. These projecting parts, which for convenience I shall hereinafter refer to as tappets, pass under, so as to move, an adjustable catch 53. When three different sizes or lengths of tappets 50, 51, 52, are made use of the catch 53 is arranged to occupy either one of three different positions. When near the periphery of the disk 49 it will be acted upon by all the tappets 50, 51, 52, (which in the device illustrated are 48 in number); when moved farther inward or toward the center of said disk 49 only the tappets 51, 52, will act upon said catch, while when moved farther inward still, only the tappets marked 52 will act upon the catch. The adjustment of the catch 53 is effected by a screw 54 mounted in appropriate framework and passing through a nut 55 forming part of a movable bracket 55ª having an arm to which lever 56 is pivotally connected at 57, said lever carrying the catch 53 and having a spring 58 connected to it. The lever 56, through the screw 59, actuates the lever 60, fulcrumed at 61 and having its opposite arm acted upon by a spring 62.

Mounted in suitable proximity to the lever 60 is the plate or quadrant 63, to which is connected at 64 one of the conductors 65 from an electrical main or other source or supply of current such as a battery 66. The other conductor 67 leads through a switch 68 to an electro-magnet 69 (required for purposes hereinafter described) and then to the terminal 70 mounted upon the metal framework carrying the levers 56, 60 and other parts. It will be seen that on the catch 53 being moved by any of the tappets 50, 51, 52, it will bring the lever 60 on to the quadrant or plate 63 so as to complete an electrical circuit. This circuit is only required to cause the completion of another circuit for enabling the filling of the sample as hereinafter described, and said circuit is broken immediately on the tappet 50, 51 or 52 leaving the catch 53. The period during which the catch 53 is engaged by the tappets 50, 51, 52 is controlled by the screw 71.

The electro-magnet 69 is provided with an armature 73 carrying a screw 74, the latter bearing on one arm of a two-armed lever 75, fulcrumed at 76 and carrying at its other end a brake 77 which makes contact with a "fly" or fan 78. The "fly" or fan is rotated by a clockwork train, said clockwork train also rotating the shaft 79. Only a small portion of this clockwork train is shown, as it is of any well known construction. The parts shown are the shaft 80, the wheels 81, 82, and shaft 79. Any appropriate number of gears may intervene between the gear 82 and said shaft 79, while another train of gears intervenes between the shaft 79 and the shaft 83 upon which is mounted the fly or fan 78. This clockwork train, including the members 79, 80, 81, 82, and the switch devices, will be hereinafter referred to as the regulating clockwork mechanism to facilitate a distinction from the ordinary clockwork mechanism hereinbefore referred to as operating the disk 49. The shaft 79 carries two cams 84, 85, the cam 84 having a notch 86 formed in it for the reception, at certain times, of the lug 87 on the lever 88 which is fulcrumed at 89 and has its other end connected to the brake part 77 so that both the brake 77 and lug 87 are operated simultaneously. The cam 84 moves a spring arm 90 carrying at its outer end a contact 91 which operates in connection with a contact piece 92. The cam 85 operates a spring arm 93 which carries at its upper end a contact 94 operating in connection with a contact 95, the contacts 92 and 95 being fixed in position. In the working of the machine as hereinafter described, it is necessary that two electrical circuits should be completed at different times by the cams 84, 85, the closing of the circuits being effected by the contacts 91, 92 and 94 and 95. The circuit which is closed by the contacts 91, 92, is by means of a conductor 97 from the main 67 to the battery 66, contact 92, the circuit including the arm 90, terminal 98, terminal 99, and the electro-magnets 44, 45. The other circuit includes a conductor 100 from the main 67, contact 94, spring arm 93, terminal 101, terminal 102, the electro-magnet 14, which controls the movements of the turn-table 1, and a portion of the conductor 97 to the battery 66.

The operation of my improved apparatus is as follows:—When one of the tappets 50, 51, 52, engages catch 53 and operates the lever 56, an electrical circuit is completed by the lever 60 making contact with the plate 63, this circuit extending from the battery 66, through the conductor 67, the magnet 69, conductor 103, the terminal 70, then through the metal framework carrying the lever 60 and to the plate 63, from there through the conductor 65 back to the battery 66, said circuit remaining closed until the actuating tappet moves clear of the catch 53 of the lever 56. This exciting of the magnet 69 will cause its armature 73 to move on its fulcrum and operate the lever 75 and cause the latter to raise the brake 77 from contact with the fan 78 and also to raise the lug 87 out of the notch 86, in this manner allowing the shaft 79 and the cams which it carries to rotate. The rotation of the cam 84 will move the spring arm 90 to cause its contact 91 to be pressed into engagement with the contact 92, and thus complete an electrical circuit through the electro-magnets 44, 45, as hereinbefore described, and during the extent of the closing of this circuit the measuring chamber 32, 33, etc., will receive its supply of powdered substance. The cam 84 is so shaped that it will allow the circuit to be broken by means of the spring arm 90 at the time that the measuring chamber is full. The continued rotation of the shaft 79 causes the cam 85 to act on spring arm 93 to move the contact 94 into engagement with the contact 95, and so complete another circuit through the electro-magnet 14, thus liberating the turn-table 1, which is thus allowed to move forward the space of one tooth in order to bring the next or succeeding receptacle 3 into position for receiving a supply of powdered substance. This latter current need only be of momentary duration and the shape of the cam 85 is so arranged as to cause a quick breaking of the circuit. The further rotation of the shaft 79 will bring the notch 86 opposite to the lug 87, which will fall therein and arrest the motion of said shaft 79, and at the same time the brake 77 will contact with the fan 78 and so hold the regulating clockwork mechanism against further operation. It will thus be seen that I employ two separate clockwork trains, one for rotating the disk 49, and the other for rotating the shafts 79, 83, of the regulating mechanism.

I preferably arrange an electric lamp or lamps 104 in the circuit so as to indicate when a sample is being taken.

In addition to the periodical taking of samples in the manner described, it is often necessary that the person in charge of the works, such as for instance a flour mill, may wish samples to be taken say from a central office at periods other than those predetermined by the clockwork mechanism of disk 49, and unknown to the workman or attendant. To enable this to be done, switches 105, 106 are arranged in the electrical circuit. The switch 105 completes a circuit through the electro-magnets 44, 45, in order to cause the opening of the measuring chamber to receive its supply or sample, and this switch is held so as to keep the circuit open for a sufficient length of time for said measuring chamber to be filled, when said circuit is broken. The said circuit includes the conductor 67, the switch 105, the conductor 107, the conductor 97, and the magnets 44, 45. The other switch 106 is only necessary to be momentarily operated in order to release the turn-table 1, so that it may carry the next or succeeding receptacle beneath the chute 24, and this circuit includes the conductor 67, switch 106, conductor 108, conductor 100, magnet 14, and conductor 97. The switch 68 may be moved so as to put the whole of the electrical apparatus out of operation.

The above description sets forth my invention as applied to apparatus for taking samples of powdered substances, and in order to enable samples of liquid substances to be taken, it is only necessary to make slight alterations from the apparatus above described. The same two clockwork mechanisms and electrical circuits are employed; so is the turn-table 1 and parts operating it, and also the series of receptacles 3, which in this case are or may be of a different shape from those above described. The solenoid 109 (or an electro-magnet) is employed to operate a valve 110 (Fig. 8) mounted in the chamber 111 of a tube or pipe 112 through which passes the liquid to be sampled, said solenoid 109 corresponding with the electro-magnets 44, 45, so that by arranging the length of time that the circuit is closed a measured quantity of liquid is supplied through the valve 110, to the receptacle 3. The said valve 110 is preferably held down upon its seat by a spring 114 and the valve spindle 115 preferably forms part of the core of the solenoid 109. It will thus be seen that the valve 110 is operated in exactly the same manner as is the measuring chamber 32, 33 above described.

In order to cover the samples after they have been deposited in the receptacles 3, I mount upon the plate 23 a magazine tube 119 for a series of disks 120. A disk 117 provided with a series of openings 118 is mounted to rotate on the plate 23 so that the openings 118 will successively pass under the tube 119. The spindle 121 of said disk 117 is provided with a chain wheel or the like 122 which gears by means of a chain 123 with a chain wheel 124 mounted upon a sleeve 125, extending over the central spindle or support A. By this means, as the turn-table 1 is rotated by its ratchet device 6 as hereinbefore described, so also will the disk 117 be rotated, and a cover or small disk 120 will fall into each of the openings 118. When any opening 118 comes over or coincides with the opening in the plate 23 arranged in position above the receptacle 3 which has last received its supply of liquid and been moved away the space of one tooth of the disk 1, one of the disks 120 will fall within the neck of the receptacle 3 beneath so that said receptacle will have a lid or cover 120 deposited in or over it immediately after being moved away from the position which it occupied while being filled.

Instead of making use of the valve 110 as shown by Fig. 8, I may make use of a vessel which actually weighs the quantities delivered to the receptacles 3, and this is effected by making use of a balanced receptacle 126 which when in the position indicated by Fig. 10 completes an electrical circuit, but which on receiving a certain quantity of liquid moves on its fulcrum and breaks the contact between its projection 126$^a$ and the contact 127 mounted on a suitable fixed portion of the apparatus. When said vessel 126 has received the quantity of liquid desired, it will automatically cause the valve 110 to be returned to its seating by means of its spring while it delivers its supply of liquid to the receptacle 3 beneath.

It will be readily understood of course that the mechanism for supplying covering disks shown in Fig. 8 may be employed in a machine having the features shown in Fig. 10, which latter figure is not intended to illustrate the entire machine.

I may arrange a switch connection with the turn-table 1 for the purpose of automatically arresting the operation of the machine when each of the receptacles 3 has received its quantity of powdered or liquid substances. Referring to Figs. 12 to 15 inclusive, I may, for this purpose employ two arms 138, 139, projecting from the turn-table 1 (Figs. 12 and 13), these arms operating upon plates 140 and 141 mounted on a fixed support $x$. Said plates bear upon rods 142, 143, mounted to slide vertically in support $x$, the lower ends of the rods being pivotally connected to a lever 144 having an extended end 145 for making contact with an electrical switch 146, this switch being of any appropriate construction and mounted in the electrical circuit controlling the movements of the valve or chamber 32, 33 and the turn-table 1. When the plate 141 is operated so as to press down the rod 143 electrical contact will be made between the end 145 of the switch lever 144 and the switch 146, while when the plate 141 is released by the arm 139 passing clear thereof and the plate 140 is pressed downward by the arm 138, the depression of the rod 142 will cause the end 145 of the lever 144 to move clear of the switch 146. As the turn-table 1 moves in the direction indicated by the arrow $a$, Fig. 12, the arm 138 passes over the plate 140 and operates the lever 144 to break the electrical circuit, this taking place when all the receptacles 3 have received their supply of material, and therefore said turn-table cannot be moved to bring a receptacle into position to receive a second supply.

When the turn-table is operated in the opposite direction to wind up its driving spring the arm 139 will press down upon the plate 141 and cause the plate 140 to rise so that on the turn-table being turned in this reverse direction through one revolution further movement is prevented by the arm 138 coming into contact with said plate 140. Fig. 13 shows the parts when in this position. It will thus be seen that the sampling machine is entirely thrown out of operation when the receptacles 3 have each received their quantity of material, while the winding up of the table is also controlled so as to automatically allow the cutting out of the electrical operating device to take place at the exact time required.

In order that with my improved apparatus any certain number of samples may be taken and then the apparatus automatically thrown out of use, I make use of a ratchet wheel or disk 147 (Figs. 14 and 15) and provide the surface of this disk with numerals corresponding to the number of teeth. Beneath this disk I provide another disk 148 upon a portion of which is an insulated part 149. This disk 148 is arranged in circuit, by means of the contacts 150, 151, with the main circuit 67. Arranged in connection with the teeth of the disk 147 are two solenoids 152, 153. The solenoid 152 is arranged in circuit with the electrical circuit for operating the electro-magnets 44, 45 (Fig. 11), for causing the feed of a sample of powder or like substance, while the solenoid 153 is in circuit with the electrical circuit for operating the electro-magnet 14, which liberates the turn-table 1. It will thus be seen that when the solenoid 152 is operated it will release the disk 147 to move the space of one half of a tooth, where it is held by the core of the solenoid 153. However when the turn-table 1 is liberated this solenoid 153 is also energized and liberates the disk 147 so as to move the remaining space of half of a tooth, said disk 147 being therefore moved at the same intermittent rate of speed as the turn-table 1. When this disk 147 reaches a certain position, such as when the number 12 moves opposite an indicator 154, then the insulated part 149 arrives under the contact 150 and thus throws the whole apparatus out of operation by breaking the main circuit 67.

From the foregoing description it will be seen that should it be desired to take say seven samples at periodical times, the disk 147 is rotated by means of its handle 155, until the figure 7 is opposite to the indicator 154. Then when the disk 147 has moved the space of seven teeth, the main electric circuit will be broken in the manner hereinbefore described so that no more samples can be taken by the clockwork mechanism even though the disk 49 (Fig. 11) may continue to rotate.

From the foregoing description it will readily be seen that a central clock or clockwork may control a large number of sampling machines, while it cannot be tampered with by the operative, neither is it exposed to the dust, dirt or fumes in proximity to the machine or other parts from which the sample or samples is or are taken, while by suitably arranging the contacts and circuits of the regulating clockwork mechanism, the person in charge thereof may arrange for a sample to be taken from one machine every quarter of an hour, another machine every half hour, and another machine every hour, or at any other appropriate regular periods of time, and further, he may, whenever desired, cause a special or extra sample to be taken from any or all of the machines without disturbing the taking of the samples at their regular periods.

Such being the nature and object of my said invention what I claim is:—

1. Apparatus for periodically taking samples of material, comprising a turn-table for receptacles, means for supplying material to such receptacles, electrically operated devices for controlling the operations of the turn-table and the supplying means, and regulating clockwork mechanism for controlling the circuits of said electrically operated devices.

2. Apparatus for periodically taking samples of material, comprising a turn-table for receptacles, means for supplying material to such receptacles, electrically operated devices for controlling the operations of the turn-table and the supplying means, regulating clockwork mechanism for controlling the circuits of said electrically operated devices, and means independent of said regulating clockwork mechanism to cause the turn-table and the supplying devices to operate at will.

3. Apparatus for periodically taking samples of material, consisting of a source of supply having a valve, means for operating the valve, means for bringing receptacles successively into proximity to said valve, said clockwork devices mounted at a distance from the other parts of the apparatus for controlling the means for operating said valve and the means for moving the receptacles.

4. In apparatus for taking samples of material, a source of supply having a valve, electrical devices for operating said valve, a turn-table carrying a series of receptacles, means for moving said turn-table, electrical devices for controlling said moving means, and clockwork mechanism for controlling both of said electrical devices.

5. In apparatus for taking samples of material, a source of supply having a valve, electrical devices for operating said valves, a turn-table carrying a series of receptacles, means for rotating the turn-table intermittently, electrical devices for controlling said turn-table moving means, clockwork devices for controlling both of said electrical devices whereby samples may be taken at predetermined periods of time, and additional switches whereby samples may be taken at times other than those predetermined by the clockwork devices.

6. In apparatus for taking samples of material, a supply passageway, a valve mounted in said passageway, electrical devices for opening said valve, a turn-table carrying a series of receptacles, means for rotating said turn-table, electrical devices for controlling said rotating means, means for closing the receptacles, and clockwork devices for controlling the operations of said electrical devices.

7. In apparatus for taking samples of material, a turn-table adapted to carry a series of receptacles, a spring for causing the rotation of said turn-table, electrical devices for controlling the movement of said rotary table, a valved measuring chamber mounted above said receptacles, electro-magnet and lever devices for opening and closing the valve of the chamber, and clockwork devices for controlling the movements of said lever and electro-magnetic devices.

8. In apparatus for taking samples of material, a turn-table adapted to carry a series of receptacles, means for moving said turn-table, ratchet teeth formed on said turn-table, a ratchet or catch for operating in connection with said teeth, an electro-magnet for moving said ratchet or catch into and out of engagement with said ratchet teeth, clockwork devices for controlling the operations of said electro-magnet, and means for feeding samples of material to said receptacles.

9. In apparatus for taking samples of material, a turn-table adapted to carry a series of receptacles, means for rotating said turn-table, means for feeding samples of material to said receptacles, a clockwork mechanism, a disk rotated by said clockwork mechanism, tappets carried by said disk, a lever moved by said tappets, electrical circuits, lever devices for causing one electrical circuit to be completed through the movements of said disk, an electro-magnet in said circuit, an armature and other intermediate parts for causing the completion of another circuit and putting into operation another clockwork train, to cause the feeding of material to a receptacle, means for causing said circuit to be broken, means for causing another circuit to be completed, and for bringing into action devices for regulating the movement of the turn-table, and means for breaking the latter circuit and arresting the movements of the second clockwork train.

10. In apparatus for taking samples of material, a turn-table adapted to carry a series of receptacles, means for rotating said turn-table, a chamber having a valve for feeding material to the series of receptacles, a disk having tappets, a clockwork mechanism for driving said disk, electrical circuits, lever devices for transmitting motion so as to complete one electrical circuit, means whereby the completion of the first circuit may cause the completion of another circuit, regulating clockwork mechanism, cam devices operated thereby, electrical contacts operated by said cams, and electrical connections from these parts to their respective electro-magnets.

11. In apparatus for taking samples of material, a turn-table adapted to carry a series of receptacles, means for rotating said turn-table, electrical devices for controlling said turn-table rotating means, a chamber having a feeding valve, electrical devices for causing the opening of said feeding valve, a clockwork mechanism, a disk driven by said clockwork mechanism, tappets carried by said disk, and means coöperating with said tappets and the other devices mentioned whereby samples of material are periodically fed to the receptacles.

12. In apparatus for taking samples of material, a turn-table adapted to carry a series of receptacles, means for rotating said turn-table, electrical devices for controlling said turn-table moving means, a chamber having a feeding valve, means for causing the opening and closing of said valve chamber, clockwork devices and electrical connections for causing samples to be taken at predetermined times, and switch devices whereby the additional samples may be taken at times other than those predetermined.

In testimony whereof I have signed my name to this specification in the presence of two subscribing witnesses.

THOMAS ROBERTS.

Witnesses:
 JOHN WHITEHEAD,
 W. GREENWOOD.